No. 809,261. PATENTED JAN. 2, 1906.
F. G. HOBART.
VALVE FOR GAS PRODUCERS.
APPLICATION FILED MAY 8, 1905.
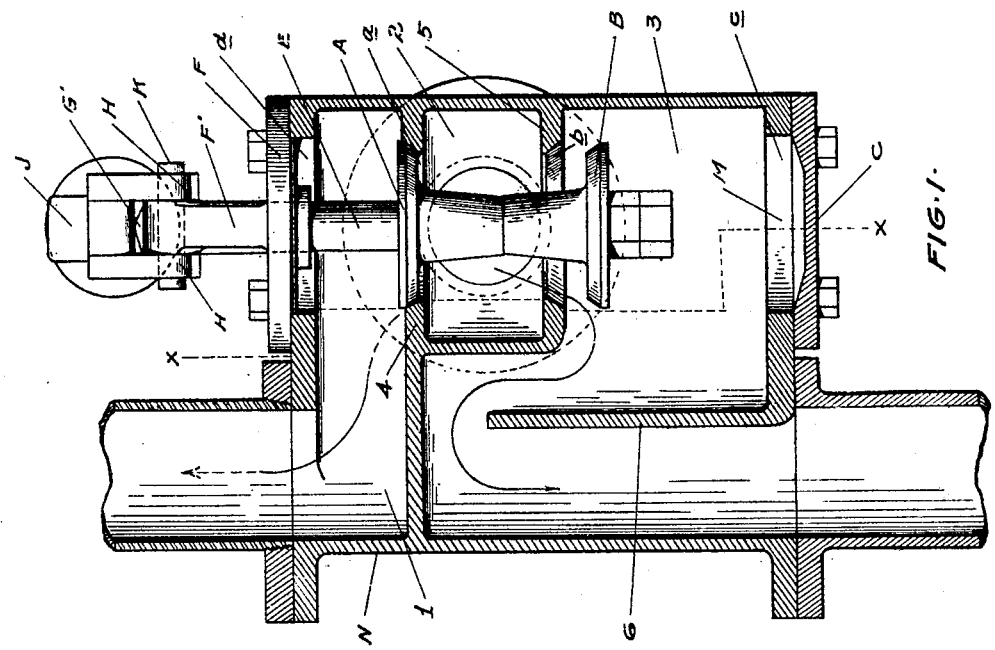
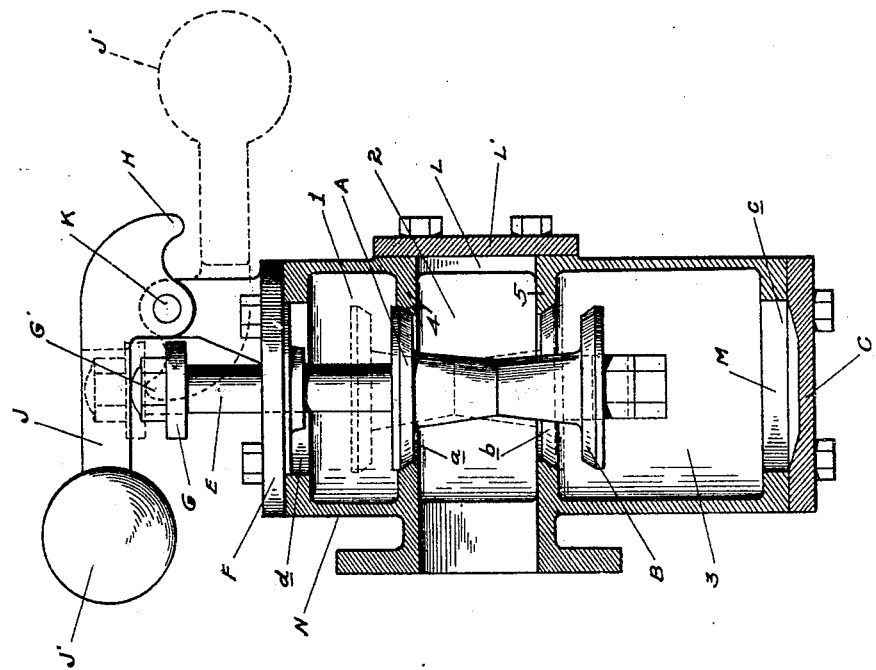
WITNESSES
INVENTOR
FRANKLIN G. HOBART
BY
ATT'Y.

UNITED STATES PATENT OFFICE.

FRANKLIN G. HOBART, OF BELOIT, WISCONSIN, ASSIGNOR TO FAIRBANKS MORSE & COMPANY, OF CHICAGO, ILLINOIS, A CORPORATION OF ILLINOIS.

VALVE FOR GAS-PRODUCERS.

No. 809,261.   Specification of Letters Patent.   Patented Jan. 2, 1906.

Application filed May 8, 1905. Serial No. 259,426.

*To all whom it may concern:*

Be it known that I, FRANKLIN G. HOBART, a citizen of the United States, residing at Beloit, in the county of Rock and State of Wisconsin, have invented certain new and useful Improvements in Valves for Gas-Producers, of which the following is a specification, reference being had therein to the accompanying drawings.

My invention relates to new and useful improvements in valves for gas-producers; and it consists in the construction and arrangement of parts thereof, as will be more fully hereinafter described, and pointed out in the claims.

The object of my invention is to form a valve to be placed between the gas producer or generator and scrubber or other part of the apparatus which will easily establish communication from the generator either to the atmosphere or to the scrubber or other part of the apparatus, as may be desired, and which can be ground on its seat to make it tight without removal or disconnection of any parts and which will automatically establish communication from the generator directly to the atmosphere in case of an explosion.

Another object of my invention is to form this valve-casing as a pocket for collecting dust from the gas passing therethrough.

In the drawings, Figure 1 is a vertical central longitudinal section through the casing, showing the valves, stem, and pivot in elevation. Fig. 2 is a transverse vertical section on the line $x$ $x$ of Fig. 1, showing the valves, stem, weight, and fulcrum in elevation.

As shown in the drawings, the casing N is constructed to form the chambers 1, open to the atmosphere; 2, an inlet-chamber open to the generator, and 3 open to the scrubber or other part of the apparatus. The walls 4 and 5, separating the inlet-chamber from the two outlet-chambers 1 and 3, I provide with the alined apertures $a\,b$. In the outlet-chambers I place the opposed valves A B, mounted on a common stem E and arranged to seat in the openings $a\,b$, respectively. In both top and bottom of the casing I provide the openings $d\,c$, of sufficient size for the insertion of the valves. These openings I close by the removable plates F C, respectively.

The stem or spindle E is extended through the chamber 1 and slidingly through an opening in the cover F, where it terminates in a screw-threaded portion of reduced diameter. On this reduced portion is fitted the collar G, secured by the nut G'. The plate F carries a standard F', preferably cast integral therewith. On this standard as a fulcrum is mounted the lever J, bifurcated to engage the end of the standard and pivoted therein by means of the pin K. The long arm of the lever J carries the weight J' and extends over and normally rests upon the nut G' on the stem E. By this construction the weight of the lever, the weight of the valves and spindle, and the atmospheric pressure tend to seat the valve A and unseat the valve B, and it is evident that whenever there is an explosion in the generating system or from any cause the pressure therein becomes greater than the weights and atmospheric pressure the valve A will be unseated and communication will be opened directly to the atmosphere from the generator. The valve A thus acts as a safety-valve. The bifurcation of the lever J forms two short arms H H, bent substantially at right angles, so that when the lever is revolved upon its axis it will rest in the position shown in the dotted lines in Fig. 2, and the arms H H will engage the collar G and raise the spindle until the valve B is seated. The valve B thus acts to cut off communication between the generator and the scrubber or other part of the apparatus. By placing the transverse wall 6 in the chamber 3 the current of gas passing down around the valve B is caused to pass upwardly again and over this wall. The portion M of the chamber 3 below the valve-opening thus acts as a collecting-pocket for a considerable amount of the dust contained in the gas, and the dust deposited in the pocket M may be readily removed through the opening $c$. To facilitate the adjustment and cleaning of the valves, I also provide the hand-hole L, covered by the plate L'.

It will be noted that there is no attachment whatever between the valve-stem outside of the valve and the operating-lever; but the valve is left free, so that it can be turned by a wrench or other means for the purpose of grinding the valve on either of its seats, this being an important feature of the invention.

From the construction it will be seen that the weighted lever may be used to tap the valve-spindle in case the valve B should become gummed and stick in its seat, and by reversing the lever it may be used to pry up the spindle in case the valve A should stick. As valves in gas-producers very often become fouled and stick in their seats, this is a very important feature of my invention.

What I claim, and desire to secure by Letters Patent, is—

1. In a valve for a gas-producer, the combination with a chambered casing having an inlet and opposed outlet-openings, of valves seating from the outside adapted to close said outlets, a stem on which said valves are mounted, one end thereof being extended loosely through said casing, and a weight pivoted on the outside of said casing and adapted to normally rest on the end of said valve-stem, for the purpose described.

2. In a valve for a gas-producer, the combination with a casing having a chamber open to the atmosphere, a chamber forming a pocket for collecting dust and open to the scrubber or other part of the apparatus, and an intermediate inlet-chamber open to the generator, the dividing-walls having opposed openings, of valves adapted to seat on the outer sides of said openings, a stem on which said valves are mounted having one end extended and passing loosely through the casing, and a weight pivoted on the outside of said casing and adapted to rest on the end of said stem to normally close the valve between the inlet-chamber and the chamber open to the atmosphere.

3. A valve consisting of a valve-casing, a vertically-removable stem extending outside of said casing, the movable elements of the valve mounted thereon, a lever pivoted on said casing and arranged to hold the valve closed in one extreme position and open at its opposite extreme position by gravity, substantially as described.

4. The mechanism for operating a vertical spindle-valve consisting of a weighted lever pivoted to the valve-casing and lying approximately horizontal in both extreme positions and engaging said valve spindle and stem, said lever resting on top of said valve-stem in one extreme position with said resting-point falling between the pivot and the center of gravity of said lever, and in its opposite position with the weight-arm resting under a collar or head in said valve-stem with the pivot falling between said resting-point and said center of gravity, whereby the weight of the lever acts to hold the valve down in the first-mentioned position and up in the last-mentioned position, substantially as described.

In testimony whereof I affix my signature in presence of two witnesses.

FRANKLIN G. HOBART.

Witnesses:
P. C. BROOKS,
GEO. B. INGERSOLL.